United States Patent
Betser-Zilevitch (10) Patent No.: US 11,777,283 B2
(45) Date of Patent: Oct. 3, 2023

(54) SYSTEM AND METHOD FOR AN INLAND PIPELINE CONTROL STATION

(71) Applicant: Maoz Betser-Zilevitch, Calgary (CA)

(72) Inventor: Maoz Betser-Zilevitch, Calgary (CA)

(*) Notice: Subject to any disclaimer, the term of this patent is extended or adjusted under 35 U.S.C. 154(b) by 476 days.

(21) Appl. No.: 17/140,438

(22) Filed: Jan. 4, 2021

(65) Prior Publication Data
US 2021/0210934 A1  Jul. 8, 2021

(30) Foreign Application Priority Data

Jan. 5, 2020 (CA) ..................... 3066536

(51) Int. Cl.
*H02B 7/08* (2006.01)
*F04B 49/03* (2006.01)

(52) U.S. Cl.
CPC ............... *H02B 7/08* (2013.01); *F04B 49/03* (2013.01)

(58) Field of Classification Search
CPC ............. H02B 7/08; F04B 49/22; F04B 49/03
See application file for complete search history.

(56) References Cited

U.S. PATENT DOCUMENTS

| | | | | |
|---|---|---|---|---|
| 10,221,856 B2* | 3/2019 | Hernandez | ............... | F04B 49/20 |
| 11,111,768 B1* | 9/2021 | Yeung | ................. | E21B 43/2607 |
| 11,125,218 B2* | 9/2021 | Botting | ..................... | F04D 1/06 |
| 11,208,878 B2* | 12/2021 | Oehring | ................... | H02B 1/20 |
| 11,339,788 B2* | 5/2022 | Babbitt | .................... | F04B 49/22 |
| 2018/0266412 A1* | 9/2018 | Stokkevåg | ............. | F04B 47/04 |

FOREIGN PATENT DOCUMENTS

| | | |
|---|---|---|
| CA | 2101814 C | 8/1993 |
| CA | 2827237 | 5/2007 |
| CA | 3035167 | 3/2018 |
| CN | 114961675 A * | 8/2022 |

* cited by examiner

*Primary Examiner* — Umashankar Venkatesan
(74) *Attorney, Agent, or Firm* — Craft Chu PLLC; Andrew W. Chu (57) ABSTRACT

A system and method for a modular inland pipeline valve control station includes a control valve, a control enclosure, a flow instrument, and a piping spool connected to a pipeline. The modular inland pipeline valve station is transportable and controlled from a central control location. The modular inland pipeline valve station is constructed, assembled, tested, and commissioned with the center control center at a module yard prior to being transported and installed at the pipeline. The modules can be installed slightly offset to the pipeline with drop-out or curved rotatable spools to allow possible access to the pipeline for testing and inspection and for connecting a pig receiver, pig launcher or a bypass.

11 Claims, 8 Drawing Sheets

SYSTEM AND METHOD FOR AN INLAND PIPELINE CONTROL STATION

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a modular pipeline valve control station assembly to reduce the construction cost and schedule and increase the maintainability for a pipeline carrying fluid.

More particularly, the present invention relates to a modular valve station comprising some or all of the required components, including the electrical and control building mounted within land transportable sized module completed tested and remotely controlled from a remote control center prior to installation and connection to the pipeline.

2. Description of Related Art Including Information Disclosed Under 37 CFR 1.97 and 37 CFR 1.98

Inland pipelines and in particular underground pipelines are commonly used to transfer fluids like oil, diluted bitumen, and gas for large distances in a safe and cost efficient manner. The pipeline includes pump stations for liquids and compression stations for gas. In addition, valve stations are required to control and obtain data on the flow between the pump stations or compression stations and to provide the required safety requirement for safe operation of a pipeline.

In recent years, the objections for transporting hydrocarbons through pipelines become the focus of well financed and organized groups. Interestingly, these vocal opposition groups are not focusing on the alternatives like transporting oil by rail, which are riskier and include much larger environment impacts ($CO_2$ emissions and derailment risks) when compared to a pipelines. Nevertheless, the result is a further drive to reduce the work in the field on the pipeline route to the minimum possible in an effort to prevent potential conflicts.

Even without the current political effect of the opposition to pipeline construction, the cost for work in the field, especially because of the nature of a pipeline which spreads over large distances between the valve control blocks, increases the logistics and construction cost of the control valve stations. Therefore, there is an advantage to minimize the construction work on site and the commissioning work at the valve stations to a minimum.

Another challenge is the need to allow an access to the pipeline for hydro test, pig launcher, pig receiver and other maintenance activities.

Traditionally the block valve equipment is assembled and connected onsite, requiring multiple trades in outdoor environments. Traditional block valve assembly tasks include, for example: cutting, fitting, wiring and welding. The commissioning activities, which include stroking the valves, running the instruments and controlling the block valve remotely from a central control station also done when on site (installed on the pope line), when the block valve is completely assembled, electrical wired and the valve and instruments are connected into their final location.

These construction and commission activities are done on the block valve sites located on the pipeline right of way. The working conditions are not ideal for such tasks, for example, cold temperatures, remote location on privet land and shortened daylight hours. Onsite work in such remote locations can be expensive, and the inclement and/or nighttime conditions result in poor productivity, further increasing the expense of constructing pipelines. Further, many different types of fittings and tools are often required, which can delay construction in remote areas if a particular required fitting or tool is not immediately available. Re-use of block valve equipment like valve and instrumentations are highly desirable, however relocating the equipment can be costly due to labor requirements.

The use of a standard modular approach can be challenging as there might be schedule and dimensional discrepancies between the underground portion of the pipeline including the raisers and the block valve units. Traditionally the block valve units, even if they are modularized, will required field work to verify fit to the existing pipeline. In some cases, early installation of such module might interfere with the pipeline construction activities, like hydro test and running cleaning and testing pigs in the underground portion of the pipeline and its raisers. In addition, traditionally the commissioning which includes a full dry-run of the control system, remotely reading the instruments and operating the actuated valves is done when the modules are already installed. In the case of a pipeline, which normally extends for large distances and whose control is done remotely from a central control room, these commissioning activities require extensive travel which involve risk and costs.

Canadian Patent Application No. 2,101,814 by DaSilva et. al. describes a modular device for the interconnection of two flexible flowlines extending between a subsea production station and a surface facility to allow running of a pig from one line to another. It includes a first flow line and a second flow line each with a first portion and with a second portion, said first and second flow lines extending between said subsea production station and said surface facility, and a device for the interconnection of said first and second flow lines to allow running of pigs from said first flow line to said second flow line, where the first portion of each flow line extends between the surface facility to said device and where the second portion of each flow line extends from said device to said station, and the second portion of the first flow line having a relatively smaller diameter than that of the first portion thereof, said device comprising a crossover apparatus module including: two curved pipeline sections, a control valve connected between said two curved pipeline sections, and first and second connectors interchangeable in respective said first and second flow lines, said curved pipeline sections having their ends remote from said control valve connected to said connectors and arranged to pass a pig in said first flow line moving away from said surface facility through said first connector, said curved pipeline sections and said control valve, and into said second connector to enter said second flow line travelling towards said surface facility; wherein each of said connectors includes a portion which is adapted to be connected to the first portion of a respective one of said flow lines extending towards the surface facility, and wherein each of said connectors ranches into a first branch adapted to be connected to the second portion of said respective one flow line which extends toward the subsea production station and into a second branch connected to a respective one of said curved pipeline sections; wherein the first branch of the first connector has a diameter smaller than the diameter of the second branch of said first connector, and the second portion of the first flow line, which is attached to said first branch of the first connector, has the same diameter as that of said first branch; wherein upon selective actuation of said control valve to an open position a pig can be launched from the surface facility along said first flow line, passed through said crossover apparatus module, and returned through said second flow line while cleaning said second flow line and pushing debris toward said surface facility.

Canadian Patent Application No. 2,827,237 by LITTLE et. al. published 2007 May 9 described a process line for excavating and processing oil sands ore near a mine face. A mobile excavator excavates ore along the length of a mobile mining conveyor. A mobile communicator receives and comminutes the excavated ore and transfers the comminuted ore to comminuted ore to a mobile slurry facility. The mobile slurry facility combines the comminuted ore with process water to produce slurry and pumps and conditions the slurry through a hydro-transport pipeline to a mobile extraction facility as a slurry feed. The mobile extraction facility receives the slurry feed and directs the slurry feed and a water stream as inputs to a three stage countercurrent cyclone separator. The cyclone separator produces a bitumen rich stream and a tailings stream. The bitumen rich stream is directed to a froth concentration unit that separates the bitumen rich stream into a bitumen product stream, a recycled water stream and a fine tailings stream. The fine tailings stream is combined with the tailings stream to produce a tailings product stream that is directed to a tailings treatment facility. The tailings treatment facility receives the tailings product and combines the tailings product with an additive to produce a treated tailings stream that is directed to a tailings pond for separation into a dry tails phase and a water phase that may be collected and recycled as industrial process water.

Canadian Patent Application No. 3,035,167 by ANDERSON et. al. published 2018 Mar. 8 describes a building structure for operating turbomachinery equipment is disclosed. The building structure includes a first pre-fabricated structure, a second pre-fabricated structure, and a connector attaching the first pre-fabricated substructure to the second prefabricated substructure. Each pre-fabricated substructure includes a rigid frame formed from a plurality of linear members. The plurality of linear members forms a first rectangular structure, a second rectangular structure, and connects the first rectangular structure to the second rectangular structure. Each pre-fabricated substructure also includes a noise attenuating sealing panel attached to one or more of the first rectangular structure and the second rectangular structure. The connector includes a spacer plate inserted between first and second pre-fabricated substructures and a fastener. The spacer plate includes an elongated opening extending through the spacer plate. The fastener is inserted through a linear member of each of the first and second prefabricated substructures and the elongated opening of the spacer plate. Ancillary systems to support the turbomachinery operation may be housed in the pre-fabricated structures to reduce site construction time and cost.

There remains a need for a modular land pipeline assembly that can be constructed, assembled, installed with control valves connected to instrumentation and with a control valve connected to a pre-assembled e-house, powered, commissioned, and controlled from a central command center while still at a module yard, away from the installation location on the pipeline.

There is a further need to allow lunching and receiving a pig from such modular block valve with minimum work on site that requires spool removal or spool rotation to service the pipeline or by-pass the block valve.

There is a further need to have a modular pipeline valve control station assembly to reduce the construction cost and schedule and increase the maintainability for a pipeline carrying fluid.

There is a further need to have a modular valve station comprising some or all of the required components mounted within land transportable sized module.

There is a further need to have a system and method for a modular land valve station for a pipeline comprising a control valve, a control module, a flow instrument and a piping spools connected to a pipeline on a transportable unit where the modules are controlled from a central control location and commissioned and tested with the center command center at a module yard fabrication yard prior to transported and installed at the pipeline. The modules can be installed slightly offset to the pipeline with rotatable spool to allow possible access to the pipeline for testing and inspection and for connecting pig receiver, pig launcher and a bypass.

BRIEF SUMMARY OF THE INVENTION

An object of the present invention is to provide a modular land pipe block valve assembly that can pre-commission prior to installation to the line. The modular assembly may comprise a control valve, flow instrumentation, power supply assembly, control assembly connected wirelessly or wire connected to a command center, emergency power supply, E-house with HVAC, connecting removable spools.

The modular pipe block valve is constructed in transportable dimensions using a single frame and installed on foundation piles close the pipeline.

The commissioning which includes a full dry-run of the control system, remotely reading the instruments and operating the actuated valves is done before the modules are installed at the pump line in an accessible location like the module yard where the modules are assembled, hence reducing the travel, risk and costs.

In accordance with one embodiment the modular block valve assembly allow an access to lunch or receive a pig through the pipeline with a flanged removable spool.

In accordance with another embodiment, the modular block valve assembly allow an access to lunch or receive a pig with an eccentric spool that can be rotated to allow access to the pipeline.

In accordance with another embodiment, the block valve assembly is installed slightly offset to the pipeline to allow bypassing the block valve with bypass spool for hydro test, pigging and other maintenance or inspection work that requires bypassing the valves and instrumentations.

In accordance with another embodiment, the present modular block valve module may further comprise at least one electrical building.

In accordance with another embodiment, the electric building comprises one or more electrical panels, one or more control panels, transformer unit and emergency back-up batteries power source.

In accordance with another embodiment, the electric building control center may further comprise one or more electrical or instrument panels for the purpose of heating, voltage scale-up/letdown, power distribution, lighting or automation.

In accordance with another embodiment, the containerized wellhead control module may comprise one or more manual valves, control valves, flow meters, electrical panels, flow control valves, pig sensor, pressure sensor, flow control valves, other control valves, drain valve, check valve and pressure safety valves.

In accordance with another embodiment, the modular block valve module may further comprise one or more electrical or instrument panels for the purpose of heating, voltage scale-up/letdown, power distribution, lighting or automation.

In accordance with another embodiment, the block valve module is offset from the pipeline.

In accordance with another embodiment, each of the modular block valve assemblies having a transportable dimension and is fully constructed offsite and transported to the pipeline block valve site as needed.

In accordance with another embodiment, the invention further includes a modular remotely control valve system for an underground pipeline comprising: An underground pipeline having a riser.

A control valve with an actuator remotely controlled.

An instrument for measuring at least one of flow pressure, flow viscosity, flow rate, pig signal and temperature.

An enclosure containing electric panel and instrumentation panel where said instrumentation panel include a controller and is in wired connection with at least one of said instrument and control valve and where said electric panel is in wired connection with said control valve.

A remote control center controlling said controller and receiving said instrument measurements.

A piping assembly connecting said control valve and said instrument and having two connections.

A single structural frame in a mobile dimension for supporting said control valve, said instrument, said enclosure containing electric panel and instrumentation panel and said piping.

A piping spool connecting said piping assembly and said riser.

Said piping assembly is substantially parallel to said underground pipeline route.

Said parallel piping assembly is at the same pipeline route of the underground pipeline between the two raisers.

Said parallel piping assembly is offset from said underground pipeline route with an offset dimension of between 1 and 20 meters.

A spool connects said piping assembly and said riser.

A removable curved spool connects said piping assembly and said riser.

Said spool allows for the connection of one or more of the following: pig launcher, pig receiver and a bypass pipe.

The present invention also includes a method for constructing a modular remotely control valve assembly for an underground pipeline comprising the steps of:

Constructing an underground pipeline having a riser.

Constructing a piping assembly having two connections and composing of a control valve with an actuator remotely controlled and an instrument for measuring at least one of flow pressure, flow viscosity, flow rate, pig signal and temperature.

Constructing an enclosure containing an electric panel and instrumentation panel where said instrumentation panel include a controller.

Constructing a single structural frame in mobile dimensions for supporting said piping assembly and said enclosure containing electric panel and instrumentation panel.

Connecting said controller by wire to at least one of said instrument and control valve.

Connecting said electric panel by wire to said control valve.

Connecting said controller to a remote control center.

Remotely controlling said control valve and remotely receiving said instrument measurements.

Transporting said single structural frame to said pipeline riser.

Installing said single structural frame on supporting piles close to said pipeline riser.

Fabricating connecting spools to the dimensions between said raiser and said piping assembly.

Connecting said piping assembly to said raiser with said connecting spool.

BRIEF DESCRIPTION OF THE SEVERAL VIEWS OF THE DRAWINGS

FIG. 7 conceptually shows 6 modules.

DETAILED DESCRIPTION OF THE INVENTION

Figure 1:
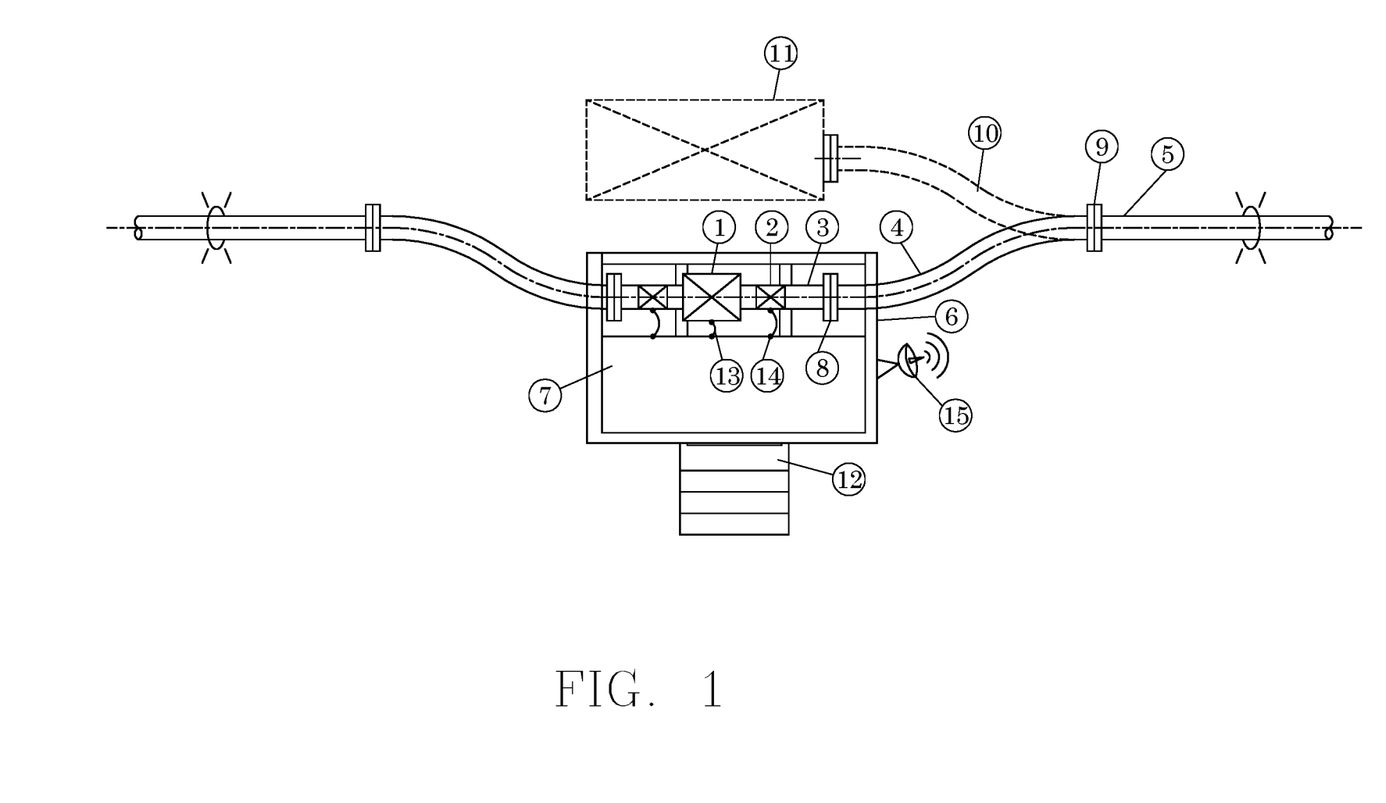
FIG. 1 is a schematic view of a lay-out of a pipeline block valve module installed and connected offset to the pipeline with rotatable spools.
Figure 2:
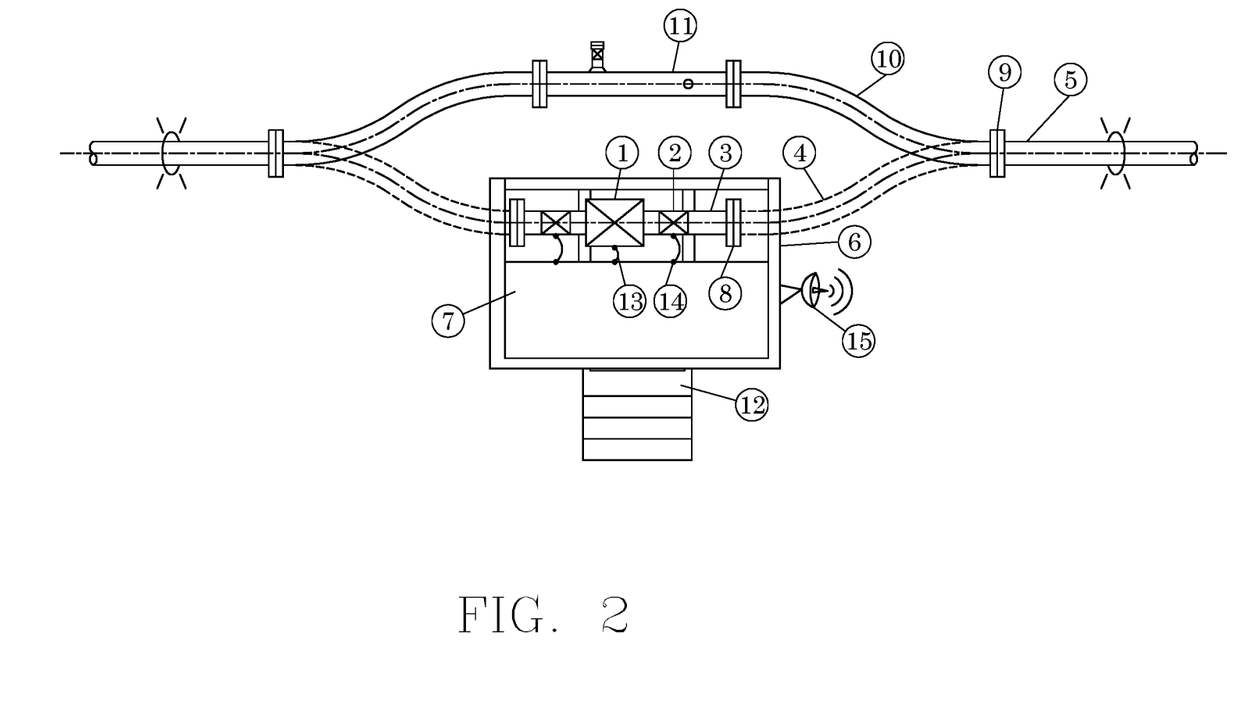
FIG. 2 is a schematic view of a lay-out of a by-pass for offset pipeline block valve module with rotatable spools.

FIG. 1 is a schematic view of a lay-out of a pipeline block valve module installed and connected offset to the pipeline with rotatable spools. FIG. 1 shows a control valve 1 installed and supported on a single frame 6. The control valve box at FIG. 1 includes at least a single actuated valve that can be remotely control. In case there is a need to completely block the flow in the pipeline 5, 1 can include additional manual or actuated valves with a bleed point between the valves (not shown). The single frame module 6 also supports an electric and instrumentation enclosure 7, like E-house. The enclosure 7 includes electrical panel, instrumentation panel and emergency power source (like batteries, compressed air or a generator). Large size enclosure (like E-house) can include HVAC system (not shown) and access stairs 12. The control enclosure is remotely control and connected 13 to the control valve 1. Instrumentation 2 can also install on the pipe 3 close to the valve. The instruments can include ant type of flow instrument used by the pipeline industry like pressure gage, flow gage, pig indicator and so on. The instruments 2 are connected to the instrumentation enclosure 7 and the information can be communicated to a control center that is monitoring the safety operation of the pipeline. The block valve module is located with offset to the pipeline 5 and connected with spool 4. Spool 4 is field fit spool to connect flange 8 on the block valve module and the pipeline riser flange 9. This offset arrangement and the associated spools 4 allows for the rotation of spool 4 by approximately 180 degrees away from the block valve module 10 which allow for the connection of pig launcher or receiver 11. Block valve module 6 is in transportable dimensions. It is fully constructed at a module yard. It is also commissioned at the module yard with the electrical and instrumentation connected between the panels within the e-house, the control valve and the instrumentations. The module can include a wireless 15 interface to communicate to the pipeline central remote control center. The wireless communication can use a satellite communication to achieve an independence from local systems and interferences. As part from the module yard commissioning the control valve 1 is tested to verify it is operated properly and controlled by the control center when the module is completed construction and still at the module yard. The block valve module is transported to the pipeline. Installed on piles where is offset to the pipeline. The piping 3 that include the control valve 1 and the instruments 2 are substantially parallel to the pipeline 5 with an offset. The dimension between the flanges 8 connections on the module 6 and the pipelines 9 are measured and the connecting spools are made accordingly to fit. The connecting "S" curved spool 4, 10 can then rotate and used for lunching or receiving pig or for any other inspection or construction activity. The connected spools FIG. 2 is a schematic lay-out of a by-pass for offset pipeline block valve module with rotatable spools. The module lay-out in FIG. 2 is similar to the layout in FIG. 1 however the block valve module 6 in FIG. 2 is disconnected from the pipeline with spools 10. Spools 10 of FIG. 2 is the same spools 4 of FIG. 1, however it was rotated away from the module 6 and connected with spool 11. This arrangement allows for the hydro testing of the pipeline 5 independent from the module 6, bypassing its valves 1 and instrumentations 2. It also allows for pigging the flow line 5 with a minimum effort to by-pass module 6 as the offset spools 4 are already part from the normal operation and just have to be rotated to offset the bypass away from module 6 valves 1 without the need to re-locate or remove any spool or equipment on module 6.

Figure 3:
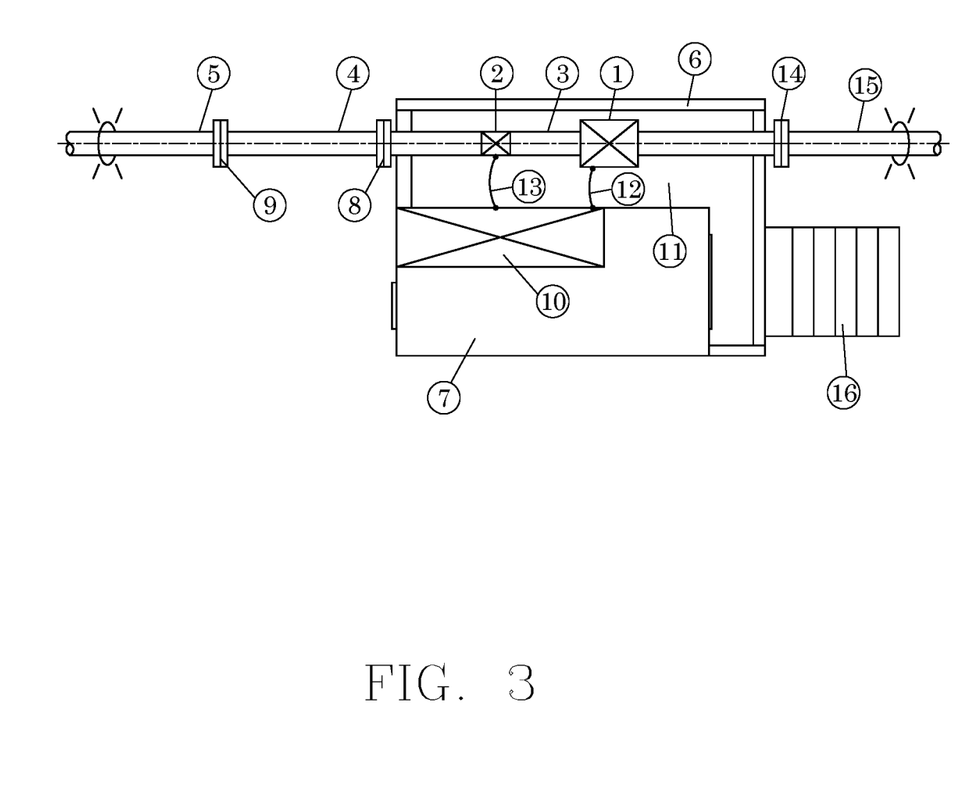
FIG. 3 is another schematic view of an embodiment of the invention for an inline control valves and instrumentations arrangement with an in-line connection spool.

FIG. 3 is another embodiment of the invention for an inline control valves and instrumentations arrangement. Module 11 includes remotely control valve 1 and flow instrument 2. Valve 1 is controlling the flow in pipeline 5 and 15. Module 11 is constructed at a module yard remotely from pipeline 5 and is supported by a structural steel frame 6. The frame 6 supports an electric and instrumentation building 7 which include electric and instrumentation panel 10 which are connected 13 to the inline flow instrumentation 2 and to the control valve 12. The pipeline block valve module includes piping spool 3 that include flanges 8 and 14 to connect to the pipeline 5 and 15. To allow field fit and potential access to the pipeline for installing a pig catcher/receiver or to any construction or inspection purpose, a drop-in spool 4 can be used between the pipeline 9 and the block valve module 8. The electric and control enclosure e-house building 7 can include access steps 16 that can be shipped to the pipeline location with or without the module 11. The piping 3 that include the control valve 1 and the instruments 2 are substantially parallel to the pipeline 5 and 15. In this arrangement there is no offset so the piping 3 that include the control valve 1 and the instruments 2 are continuation and on the same line as the pipeline. The dimension between the flanges 8 connections and the pipelines 9 are measured and the connecting spool 4 is made accordingly to fit.

Figure 4:
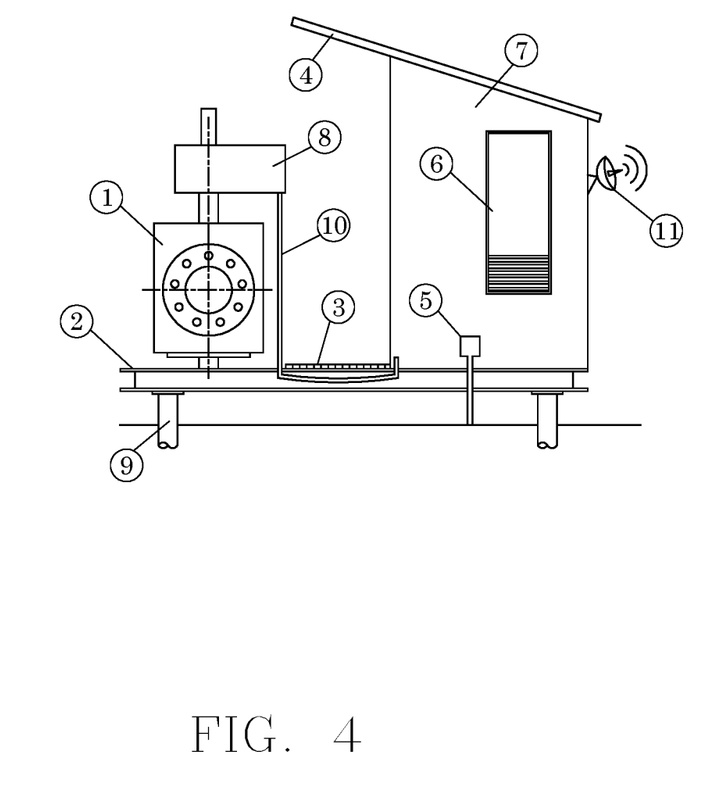
FIG. 4 is a side schematic view of an embodiment of the invention for an inline control valves and instrumentations arrangement.

FIG. 4 is another embodiment of the invention for an inline control valves and instrumentations arrangement. Module 2 is constructed in a module yard in transportable dimensions and includes a base steel frame 2 supporting a valve 1 and electrical building 7. The valve 1 includes an actuator 8 that control the valve remotely. The actuator is connected to the electric building 10 to receive the power to operate the actuator 8 (the power can be electric, hydraulic or pneumatic) and the control command to open or close the valve 1. The module 2 includes a platform 3 to allow access to the valve 1 and instruments (not shown) the e-house 7 includes an HVAC system 6 to control the internal conditions like temperature. The e-house includes a wireless communication 11 for remote control to obtain instrumentations input from a remote control center that is monitoring the pipeline operation. The e-house is receiving electrical power from a local power cable. It can also receive communication by wire in additional or instead as stand-alone control input signal source. The block valve module 2 is supported close the pipeline on piles 9 that provide a stable and cost-effective foundation means. The E-house roof 4 can extend over the e-house to cover portion of the module to provide some protection from snow, rain and sun for the valve actuator and instruments and more operation friendly to truck and maintain, by providing overhead cover for the operator access area above walk-way 3. The e-house control building can include a back-up power source in the form of battery, compress air or other so it can close the valve 1 in case of emergency as required by the local code or pipeline operation regulations. To allow that, the building 7 can include insulated and fire rated enclosure to operate the valve and send the instrumentation reading to the remote control center even in case of emergency and fire.

Figure 5:
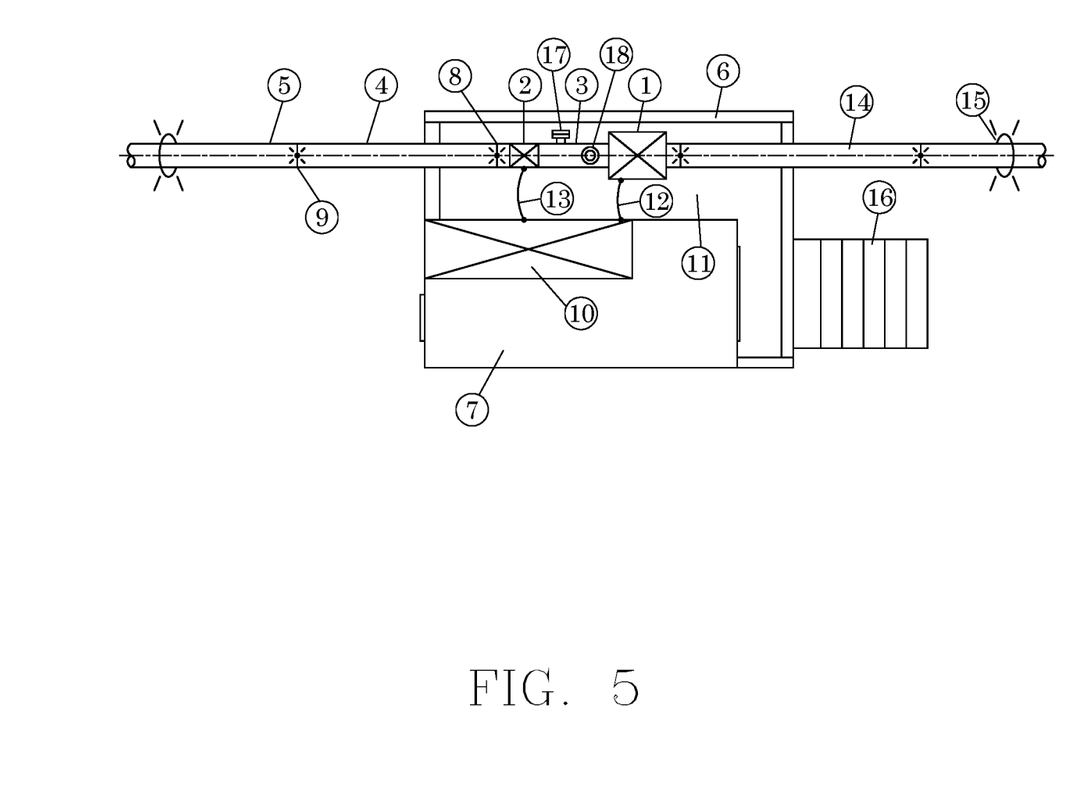
FIG. 5 is another schematic view of another embodiment of the invention for a welded control valves and instrumentations arrangement.

FIG. 5 is another embodiment of the invention for an inline control valves and instrumentations arrangement. The embodiment of FIG. 5 is substantially similar to the embodiment of FIG. 4 Module 11 is constructed in a module yard in transportable dimensions using a base structural steel frame 6 and includes valve 1, instrumentation 2 PSV connection 18 and drainage point 17. The E-house 7 includes electrical and instrumentation panels 10 for powering and control the valve 1 and instrumentation 2. The e-house building 7 is accessible by stairs 16 that can be separate from the module 11 and installed on site as needed. The spool 3 that is part from module 11 and includes valve 1 and instrument 2 is welded to the pipeline 5 and 15 using field weld. The on module spool 3 can include additional flow elements like check valve or any additional flow element required by the pipeline block valve station process requirement. In case the pipeline riser 15 is constructed prior to the set-up of the clock valve module 11, it is possible to guarantee pipe fit by the use of connection spools 4 and 14 with two field welds. This option will provide dimensional flexibility to connect the module 11 after the pipeline above ground 15 raisers 5 already installed so spools 4 and 14 will be required for the connection.

Figure 6:
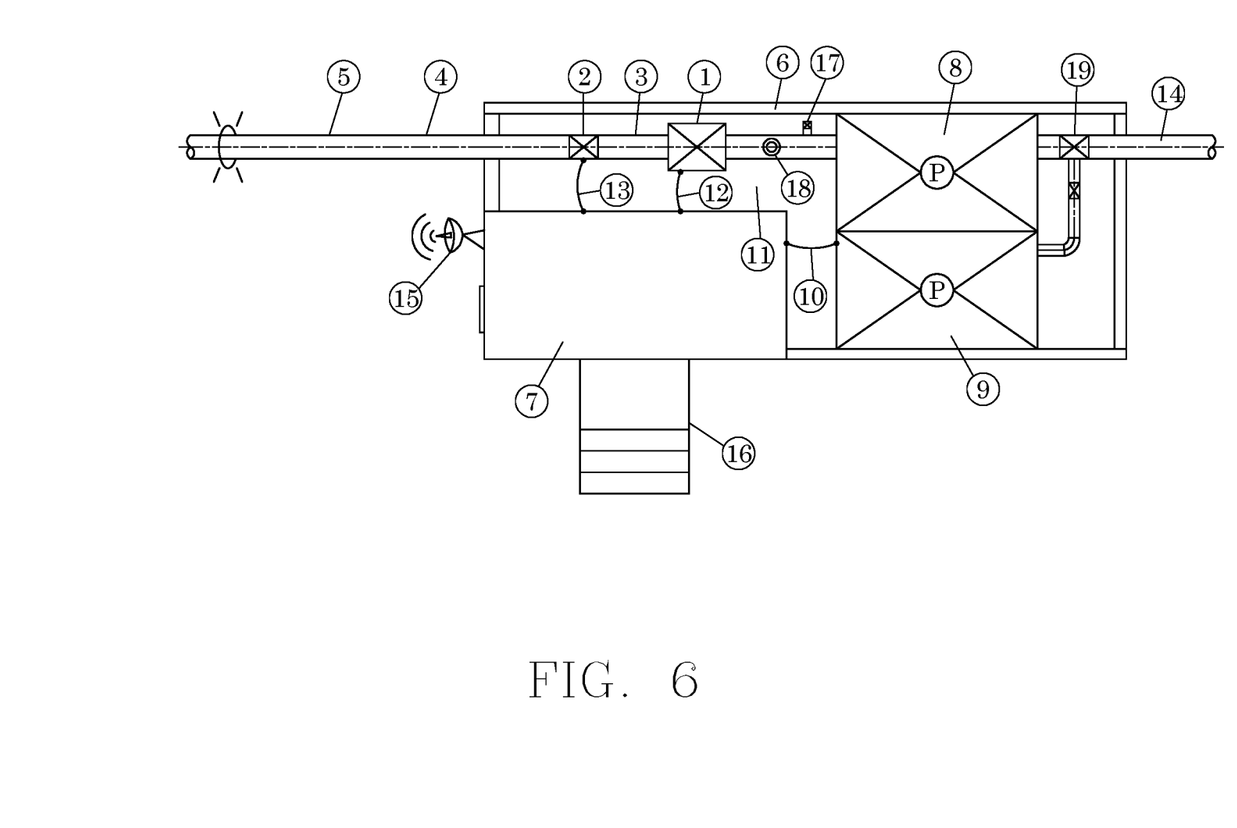
FIG. 6 is another schematic view of an exemplary embodiment of the invention that includes modularized pumps together with the valve and instruments on a transportable module.
Figure 7:
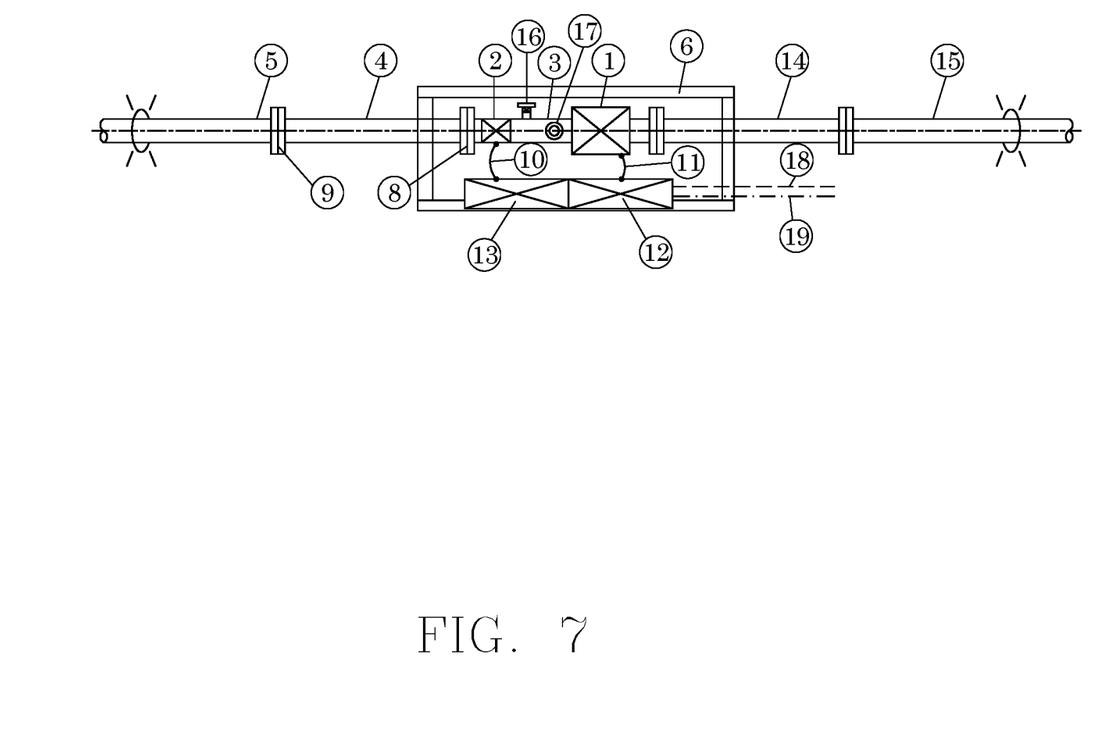
FIG. 7 is a schematic view of another exemplary embodiment of the invention with instrumentation and electrical enclosures.
Figure 8:
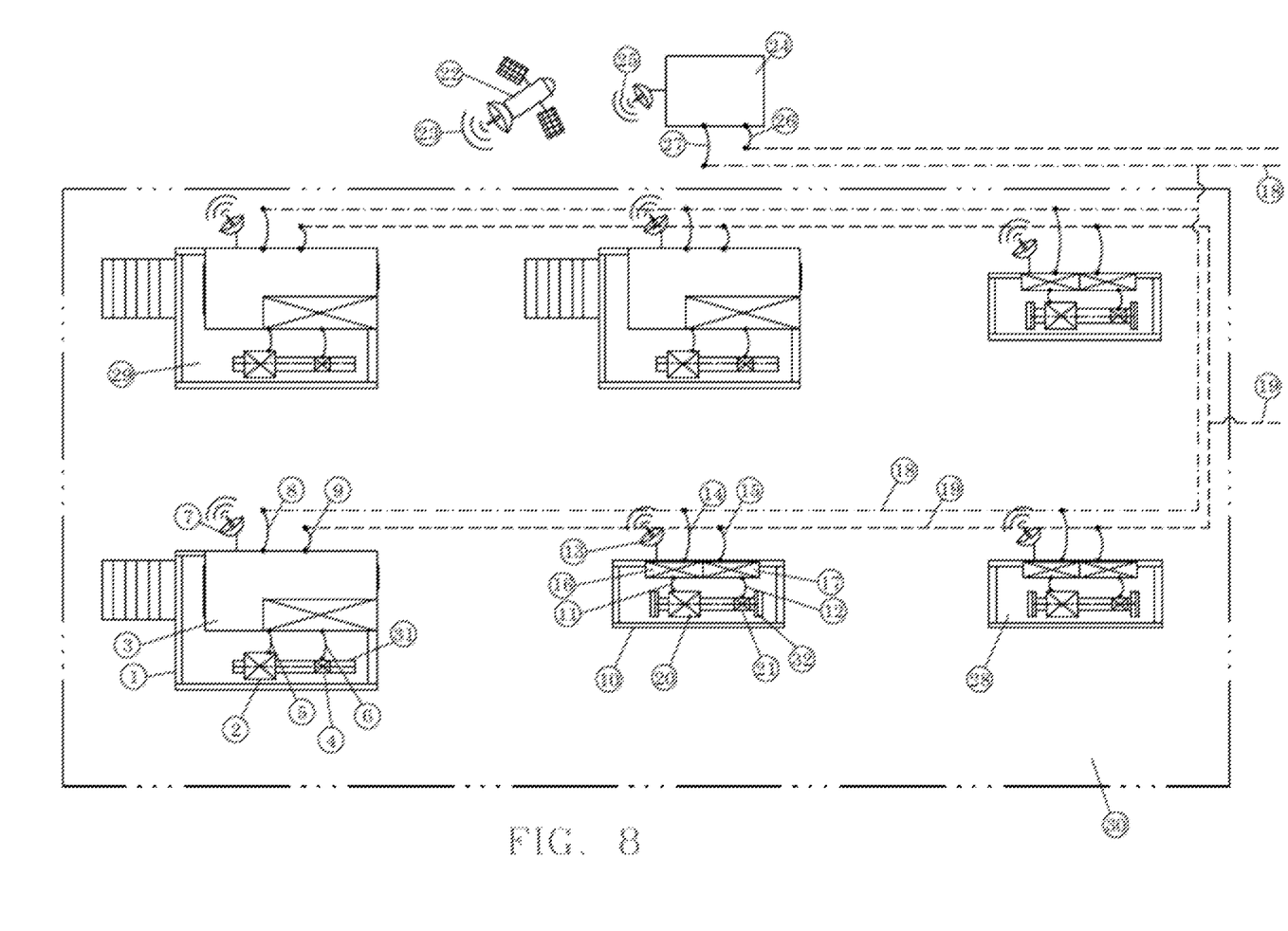
FIG. 8 shows a schematic view of the invention during the final module assembly construction and commissioning, before the installation at the pipeline station.

FIG. 6 is another exemplary embodiment of the invention that includes modularized pumps together with the valve and instruments on transportable module 11. Module 11 includes MCC 7. The MCC include the electrical and instrumentation cabinets as with the block valve modules. Due to the pumps 8 and 9, the energy requirements from the MCC electrical building 7 are far larger than for modules that do not include pumps and high voltage 3 phase switch board will be required, possibly with large size VFD and HVAC system to control the temperature inside the MCC building 7. The MCC electric and control building 7 is controlling valve 1, which have an actuator and is remotely monitored and controlled with satellite wireless control 15 from a remote command center. The electrical building 7 can be constructed as an independent module constructed remotely from the module yard by a specialized electrical building contractor. The E-house 7 is also a motor control center (MCC) and can comprise a plurality of MCCs to control pumps 8 and 9 motors. It can also include an instrument air package and hydraulic package. The MCC and other electrical equipment mounted in the e-house 7 provide electricity to operate the pumps. The electrical building can also include transformer (not shown). The E-house 7 can be assembled remotely with all equipment installed within the mobile E-house building at its fabricator shop and shipped to the module yard to be installed onto module 11 and connected to the pumps, valves and instruments. The E-house 7 can include one or more electrical panels, instrument air compressor, hydraulic pump, electrical or instrument panel for heating, voltage scale-up/letdown, power distribution, lighting or automation. The E-house can be remotely control from a remote central command center by a satellite communication 15. The S-house include predetermine fire protection and it can include a source of auxiliary emergency power like batteries to close the automatic valve and communicate data from the instruments to the remote main control center. Module 11 includes two pumps 8 and 9. The pumps can operate in serial or parallel, possibly with one pump as a stand-by pump portion of the time or continually. The module 11 includes instruments 2 and 19 to obtain flow data to control the pumps and the valves. Instruments 2 are wired 13 to the MCC 7. Instruments 19 also connected to the MCC (not shown). Both pumps electric motors are connected to the MCC building 10. Connection 10 is a high power electrical connection to run the pumps and it is remotely control, through the MCC controllers, from the main pipeline control center through a satellite communication 15. Pumps 8 and 9 foundation design is using a floating foundation to prevent vibration travel from pump 8 to 9 and vice versa through module 11 structural steel. The pumps can also be arranged and oriented differently on the module to increase the spaces. For large size horizontal pumps, if a concrete foundation is required, the concrete will be poured on site to minimize the module weight. Module 11 also includes one or more control valves 1, manual valves, check valves and PSV 18. The control valve actuator is connected 12 to the E-house MCC 7 and remotely controlled 15. The piping spools on module 11 also include one or more drainage points 17, possibly with communication to HVAC truck for maintenance. The access to the module is through stairs 16, which can be shipped loose to site. The module piping is connected to the pipeline piping 4 and 14 by welding or flanges (not shown). E-house building 7 includes an FIG. 7 is another exemplary embodiment of the invention. Module 6 in transportable dimensions includes a supporting steel frame which supports a valve 1 and flow instrument 2 installed on pipe spool 3. The piping on the module also includes a drain point 16 and a PSV connection 17. The module includes an electric panel enclosure 12 and instrumentation panel enclosure 13. The electric and instrumentation enclosures are connected to an electric power cable 18 and control cable 19. The valve 1 is control and operated 10 by the power supplied from the electric panel 12 and control by the control panel 13. The input from the flow instrument is delivered to the instrument control panel 13 through connection 10. The valve block module 6 is connected through flanges 8 to connecting spools 4 and 14 to allow field fit by fabricating the spools to fit the pipeline risers 5 and 15 exact flange 9 location. The spools 4 and 14 can also be removed for inspection to provide a direct access to the pipeline. It is also possible (not shown in FIG. 6) to install module 6 offset to the pipeline as in FIGS. 1 and 2 and use a rotatable "S" curved spool to connect to the pipe with the option to by-pass the module 6 for installing a by-pass spool or pig launcher/receiver. The control cabin 13 can be controlled by wire input and output cable 19 or by a wireless communication FIG. 8 shows the invention during construction, before the installation at the pipeline. FIG. 7 conceptually shows 6 modules from two types 28 and 29 at a module yard area 30. The module yard 30 can include any number of modules as required by the pipeline valve stations. The complete modules from type 29 include a structural steel frame 1 supporting actuated valve 2 and flow instrument 4. Additional valves and instruments can be used as well. The valves and instruments are installed with piping spool 30 that can include a welding preparation 31 to weld the spool at the field to the pipeline. Flanges connections can be used as well. The actuated valve 2 is connected 5 to E-house 3 that include electric and control panels. The instrumentation 4 is connected to the E-house instrumentation panel. Steps can be used to temporary access the module 29 platform and e-house. The e-house can include a satellite wireless connection to control the valve and to communicate the instrumentation input to a central control center. The E house is powered at the module yard by a temporary power 9 connection and can be also controlled to wire communication line 8 for control in parallel or instead the wireless control 7. Module 28 is a different type of module that does not include an e-house but only a smaller electric enclosure 17 continuing electric board and instrumentation enclosure 16 containing instrumentation panel. Bothe the instrumentation and control enclosure cabinets are supported and installed on the module structural steel 10 and wired 11 to the valve actuator 20 and to the flow instrumentation 21. The piping on module 28 includes flange connection 32 to connect to the pipeline in the field, possibly with curved or straight connecting spools (not shown). The connection can also include weld connection instead of the flanges, similar as 31. Module 28 is connected 15 to a power supply and to wire control wire. Module 28 can also include a wireless connection 13 possibly with satellite transmitter 22 to achieve an independent and reliable communication. 24 is a central remote control center that is responsible on the operation integrity and control of the pipeline. As such, all the control block valves are continually controlled by the control center 24 at any given time after they are installed at the field and connected to the pipeline. The control center 24 is provided with power and wireless satellite communication 25 that are connected through satellite 22 to the individual pipeline block modules 7. Wire communication 18 can be use as well or in parallel to connect the modules 28 and 29 to the central control center. All the completed modules 28 and 29 at the module yard 30 are tested and commissioned while still at the module yard include the individual communication and control of each valve, instrument or pump with the central command center 24 through satellite communication 23 or otherwise before they transported from the module yard to the field. FIG. 8 includes two schematic module layouts of 28 (without an e-house and with flange connections) and 29 (with an e-house and with welded connections). Any type of lay-out of the modules describes in drawings 1-7 or portions of the characteristics can be used as well, according to the specific pipeline requirements.

I claim:

1. A modular remotely control valve system for an underground pipeline, comprising:
    an underground pipeline having a riser;
    a control valve with an actuator remotely controlled;
    an instrument for measuring at least one of flow pressure, flow viscosity, flow rate, pig signal and temperature;
    an enclosure containing an electric panel and an instrumentation panel, wherein said instrumentation panel is comprised of a controller and is in wired connection to at least one of the instrument for measuring and said control valve, and wherein said electric panel is in wired connection to said control valve;
    a remote control center controlling said controller and receiving instrument measurements;
    a piping assembly connecting said control valve and the instrument and having two connections;
    a single structural frame in a mobile dimension for supporting said control valve, said instrument, said enclosure containing electric panel and instrumentation panel and said piping; and
    a piping spool connecting said piping assembly and said riser.

2. The system of claim 1, wherein said piping assembly is to said underground pipeline.

3. The system of claim 2, wherein
    said parallel piping assembly is at a same pipeline route of the underground pipeline between two risers.

4. The system of claim 2, wherein
    said parallel piping assembly is offset from said underground pipeline route; and
    wherein said offset dimension is between 1 and 20 meters.

5. The system of claim 1, further comprising: a spool connecting said piping assembly and said riser.

6. The system of claim 4, further comprising: a removable curved spool connecting said piping assembly and said riser.

7. The system of claim 5, wherein said spool is comprised of a connection of one of a group consisting of: pig launcher, pig receiver, and a bypass pipe.

8. A method for constructing a modular remotely control valve assembly for an underground pipeline comprising the steps of:
    constructing an underground pipeline having a riser;
    constructing a piping assembly having two connections and being comprised of a control valve with an actuator remotely controlled and an instrument for measuring at least one of a group consisting of: flow pressure, flow viscosity, flow rate, pig signal, and temperature;
    constructing an enclosure containing an electric panel and instrumentation panel, wherein said instrumentation panel is comprised of a controller;
    constructing a single structural frame in a mobile dimension for supporting said piping assembly and said enclosure containing electric panel and instrumentation panel;
    making a wired connection between said controller and at least one of said instrument and control valve;
    making a wired connection between said electric panel and said control valve;
    connecting said controller to a remote control center;
    remotely controlling said control valve and remotely receiving said instrument measurements;
    transporting said single structural frame to said pipeline riser;
    installing said single structural frame on supporting piles close to said pipeline riser;
    fabricating a connecting spool having dimensions between said raiser and said piping assembly; and
    connecting said piping assembly to said raiser with said connecting spool.

9. A modular remotely control valve system, comprising:
    an underground pipeline having two risers;
    a single structural frame being in a mobile dimension and being located offset parallel to the pipeline between said two risers;
    a control valve being supported on the structural frame and having an actuator;
    an enclosure being supported on the structural frame;
    an electric panel being contained within said enclosure and being in wired connection to said control valve;
    a control panel being contained within said enclosure and being in wired connection to said control valve so as to remotely control said actuator; and
    two piping spools connecting said control valve to said two risers.

10. The modular remotely control valve system of claim 9, wherein said two risers are comprised of a plurality of spool flanges, each spool flange being connected to a respective piping spool, and wherein said two piping spools are comprised of a plurality of riser flanges, each riser flange being connected to r respective riser.

11. The modular remotely control valve system of claim 10, further comprising:
    at least one pig device of a group consisting of: a pig launcher and a pig receiver,
    wherein said at least one pig device is parallel to the structural frame, and
    wherein said at least one pig device is removably engaged to at least one riser by rotation of a respective piping spool.

* * * * *